United States Patent Office 2,993,031
Patented July 18, 1961

2,993,031
N-ISOPROPENYL-CYCLIC CARBAMATE COMPOUNDS AND POLYMERS THEREOF
William W. Bakke, Wilhelm E. Walles, and William F. Tousignant, Midland, Mich., assignors to The Dow Chemical Company, Midland, Mich., a corporation of Delaware
No Drawing. Filed May 22, 1958, Ser. No. 736,975
17 Claims. (Cl. 260—77.5)

The present invention is germane to the organic chemical arts. It has more pertinent reference to certain N-isopropenyl-cyclic carbamate compounds, which are new and useful monoethylenically unsaturated monomeric substances, and to various derivatives thereof, particularly polymeric and resinous products that have great utility and provide for many benefits and advantages in numerous applications. The invention is also concerned with the preparation of the indicated N-isopropenyl-cyclic carbamate compounds.

One basic object of the invention is to provide, as new compositions of matter, N-isopropenyl-cyclic carbamate compounds that contain the characterizing group:

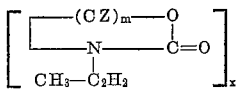    I wherein each Z is independently selected from the group consisting of hydrogen, methyl, ethyl, propyl, butyl, (i.e., alkyl radicals containing from 1 to about 4 carbon atoms), monohaloalkyl radicals containing from 1 to about 4 carbon atoms (i.e., chloromethyl, chloroethyl and analogous fluoro-, bromo- and iodo- alkyls, etc.), and aryl radicals containing from 6 to about 10 carbon atoms (i.e., phenyl, alkyl substituted-phenyl, etc.); $m$ is an integer from 2 to 3; and $x$ has a numerical value of at least 1. As is apparent, the N-isopropenyl-cyclic carbamate compounds of the present invention comprehend N-isopropenyl-2-oxazolidinones and N-isopropenyl-2-oxazinidinones (which may also be respectively identified as 3-isopropenyl-2-oxazolidinones and 3-isopropenyl-2-oxazinidinones).

A particular object of the present invention is to provide monomeric N-isopropenyl-cyclic carbamate compounds of the indicated varieties and characterizable in having the generic structure:

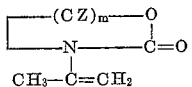    II wherein each Z and $m$ are as in Formula I.

A specific object of the invention is to provide monomeric N-isopropenyl-2-oxazolidinone, hereinafter referred to (for convenience and simplicity) as IO, which is of the structure:

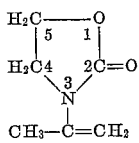    (IIa)

Another specific object is to provide monomeric N-isopropenyl-5-methyl - 2 - oxazolidinone, hereinafter referred to as IO-M, which is of the structure:

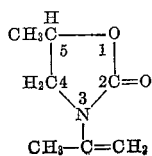    (IIb)

Yet another specific object is to provide monomeric N-isopropenyl-5-ethyl - 2 - oxazolidinone, hereinafter referred to as IO-E, which is of the structure:

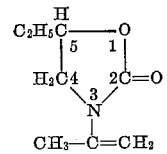

Yet another specific object is to provide monomeric N-isopropenyl-5-phenyl-2-oxazolidinone, hereinafter referred to as IO-P, which is of the structure:

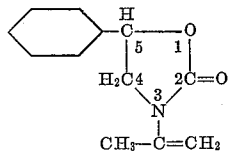    (IIc)

Still another specific object is to provide monomeric N-isopropenyl-2-oxazinidinone, hereinafter referred to as IOZ, which is of the structure:

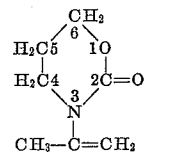    (IId)

A related object is to provide an advantageous method for the manufacture of monomeric compounds of the indicated varieties, particularly IO, IO-M, IO-E, IO-P and IOZ.

A further object, and one that is of considerable importance, is to provide polymeric products, including homopolymers and various copolymers, that are derived from the N-isopropenyl-cyclic carbamate monomers of the indicated varieties, especially those derived from IO, IO-M, IO-E, IO-P, and IOZ, hereinafter referred to as PIO, PIO-M, PIO-E, PIO-P, and PIOZ, respectively.

An associated object of the invention is to provide polymeric products of the indicated varieties having exceptional advantages and benefits for use in many applications, including their use as dye-assisting adjuvants or dye-receptors for synthetic textile fibers of various types, for clarifying such essentially clear beverages as beer, wine and the like vegetable-derived beverages, in hair-setting compositions, and for many other purposes.

A still further object of the invention is to provide methods for the preparation of polymeric N-isopropenyl-cyclic carbamate compounds of the indicated varieties.

According to the present invention, the new monomeric compounds which possibilitate the achievement of the above indicated and cognate objects (including the formation of new polymeric products) are of the general structure of Formula II. A great number of the monomeric N-isopropenyl-cyclic carbamate compounds are ordinarily clear, colorless liquids at, or at least near, normal room temperatures. Some of the monomers, however, particularly the aryl (such as phenyl) ring-substituted derivatives, are normally solid, meltable substances. They are ordinarily soluble in water and lower aliphatic alcohols, such as methanol, ethanol, propanol and many other organic solvents. This is generally true for IO and the lower alkyl (such as methyl in IO-M) ring-substituted species. Bulkier substituent units (such as phenyl in IO-P) often tend to diminish the water-solubility of the monomeric N-isopropenyl-2-cyclic carbamate compounds.

For example, IO-M is a clear, actually water-white liquid at room temperature which is water-soluble as well as being soluble in methanol, ethanol, styrene, diethylene glycol, benzene, 2-pyrrolidinone (sometimes called 2-pyrrolidone), methylene dichloride, acetone, chloroform, dimethyl formamide, nitromethane, acetic acid, aniline, ethylene carbonate, dimethyl ether, diethyl ether, the dimethyl ethers of di-, tri-, or tetraethylene glycol, dimethyl sulfoxide, Skelly Solvent 100–140° C., and the like. IO-M is insoluble in such solvents as cyclohexanol, hexane, kerosene and mineral oil. Under an absolute pressure of about 0.2 mm. Hg, substantially pure IO-M boils at temperatures between about 50° and 51° C. Of course, the degree of purity of the monomer may tend to alter the boiling point of the material to some extent. Monomeric IO-M has a refractive index, taken at 25° C., of about 1.4831 and a specific gravity, taken at 25° C. and referred to water at 4° C. of about 1.068. Monomeric IO and IO-E have properties that are generally analogous to those of IO-M. Upon infrared analysis, the monomeric compounds exhibit the characteristic absorption bands that are obtained when N-isopropenyl groups and

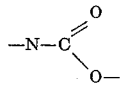

structural formulations are present.

The monomeric N-isopropenyl-cyclic carbamate compounds are relatively unstable upon exposure to light, particularly sunlight. Generally, the unstabilized monomers become discolored to a very light shade of yellow within several days of continued exposure to light. However, when they are kept in the dark, particularly when they are maintained under an atmosphere of nitrogen, their natural stability is usually good. Thus, the monomeric N-isopropenylcyclic carbamate compounds may be stored safely for prolonged periods when maintained so as to be protected in the indicated manner. The monomerric compounds react with solutions of bromine in chloroform, as evidenced by rapid discoloration of the halogen solution, due to the bromination of the isopropenyl groups in the monomers. Dilute solutions of potassium permanganate and the like reagents rapidly oxidize the isopropenyl group of monomeric N-isopropenylcyclic carbamate compounds.

The monomeric N-isopropenyl compounds of the indicated varieties may advantageously be prepared by a method in accordance with the practice of the present invention which involves the reaction with methyl acetylene in the absence of moisture with a desired cyclic carbamate (such as 5-methyl-2-oxazolidinone, 5-ethyl-2-oxazolidinone, 5-phenyl-2-oxazolidinone, 2-oxazinidinone, etc.) and in the presence of small amounts of an alkali, such as sodium hydroxide, potassium hydroxide or lithium hydroxide that is present in a quantity between about 1 and 5 percent or so of the cyclic carbamate under a pressure of about 400–1200 p.s.i. at a temperature between about 100–200° C., preferably 150–200° C., until the desired monomeric product is obtained. Other suitable alkalis include the elemental alkali metals (i.e., Li, Na and K) as well as the hydroxides of calcium, barium and strontium. Ordinarily, the reaction is completed to a satisfactory extent within a period of time of from about 6 to 24 hours. Usually it is beneficial to rock or otherwise gently agitate the reaction mass during the course of the reaction. The desired monomeric N-isopropenyl-cyclic carbamate product can be recovered easily from the reaction mass using fractional distillation techniques.

The monomeric N-isopropenyl-cyclic carbamate compounds of the Formula II may also be prepared with advantage by a procedure which involves the transisopropenylation of a suitable starting cyclic carbamate with an alkyl isopropenyl ether under the influence of certain catalysts, such as mercuric acetate (HgAc₂). The alkyl (including cycloalkyl) isopropenyl ether that is employed may contain from 1 to about 1 carbon atoms or so in the alkyl radical. Isopropenyl ether, n-butyl isopropenyl ether, ethyl cyclohexyl isopropenyl ether and the like are typical of the alkyl isopropenyl ethers that may be employed satisfactorily for the transisopropenylation reaction. A transisopropenylation for preparation of the monomers of the invention is represented by the following equation, using 5-methyl-2-oxazolidinone and ethyl isopropenyl ether for purposes of specific illustration.

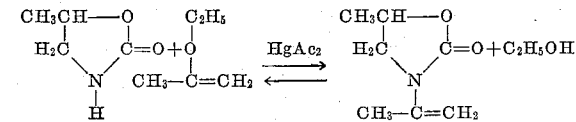

Some acetal by-products are also usually obtained in the reaction. Other catalysts, including mercuric benzoate, zinc acetate, phenyl mercuric acetate and the like be employed in place of or in combination with the mercuric acetate. Still other catalysts in addition to those mentioned that may be employed with advantage for the transisopropenylation reaction of the present invention are any of the mercury salts of carboxylic acids, which salts are soluble in the reaction mixture and which are formed with acids having a pK$_a$ value in water in the range of about 4 to about 7. These include mercuric citrate, mercuric oxalate, mercuric linoleate, mercuric succinate, etc. Other organo mercury compounds, such as chloro mercuric acetaldehyde, which have commensurate solubilities in the reaction mass and ionization characteristics in water may also be utilized as catalysts. Generally, an amount of the catalyst up to about 5 or 10 percent by weight, based on the weight of the reactant starting cyclic carbamate material, may be required for the accomplishment of the transisopropenylation. Frequently, only 1 percent or less of the catalyst may be found to be required. Usually, relatively greater quantities of the catalyst are necessary to employ when the reaction is performed by batch-wise techniques instead of according to continuous processing arrangements.

It is desirable (though not an absolute necessity) for the transisopropenylation reaction to be conducted in a solvent vehicle that is free from substituent hydroxy groups (such as dioxane, dimethyl formamide and the above-mentioned ethers of ethylene glycols and the like) and for the reaction mass to be maintained under an atmosphere of an inert gas, such as nitrogen, during the course of reaction. The latter technique, however, is likewise not an absolute requirement. The reaction may be performed with benefit at temperatures from about 110° to 170° C., or so. Better results may often be obtained when the temperature of reaction is maintained between about 140° and 160° C. The reaction will occur under any desired pressure although, when it is being conducted in autoclaves and the like apparatus, especially when the solvent vehicles are employed, it is most convenient to accomplish the transisopropenylation under autogenous pressures. Ordinarily, good conversions and yields of desired product from the converted starting materials can be realized according to the transisopropenylation technique within reaction periods of twenty-four hours or less. By way of illustration, conversions in the neighborhood of 40–50 percent and greater and yields of from 80–90 percent and higher are easily possible to attain.

The desired monomeric N-isopropenyl-cyclic carbamate products can be recovered with little difficulty from the particular reaction mass in which they are prepared using procedures that will be readily apparent to those who are skilled in the art. Thus, fractional distillation, solvent extraction, precipitation and/or stripping techniques can be employed for product isolation, depending upon the exigencies of specific situations.

The N-isopropenyl-cyclic carbamate monomers of the present invention will undergo polymerization in mass (which is oftentimes referred to as bulk polymerization) as well as polymerization, at practically any level of concentration, in aqueous or other solution or in emulsion or other dispersion in liquids with which the particular monomer or monomers being polymerized is or are not at all soluble or only partially soluble. It is ordinarily beneficial for the polymerization to be conducted at a temperature between about 50 and 100° C., although this may vary with the particular catalyst, monomer, and solvent or carrier, if any, used and type of reaction being conducted. Suitable catalyst or initiators for polymerization of the monomeric N-isopropenyl-cyclic carbamate compounds include the peroxygen catalysts, such as hydrogen peroxide, benzoyl peroxide, potassium persulfaet and the like, and ionic catalysts such as boron trifluoride-ether complex, as well as irradiation under the influence of high energy fields. The latter catalyzation may include the various actinic radiations, including such diverse forms of catalysis as ultraviolet, X-ray and gamma radiations from radioactive materials and high energy electron beams generated from linear accelerators, resonant transformers, electrostatic generators, and the like. Ordinarily, the azo catalysts (such as $\alpha,\alpha'$-azobis-isobutyronitrile) are not well adapted for polymerization of the N-isopropenylcyclic carbamate monomers.

Surprisingly enough, the N-isopropenyl-cyclic carbamate monomers of the present invention polymerize in a ready and relatively easy manner, despite the fact that many of the isopropenyl monomers of other varieties which are known to the art are exceedingly difficult, if not impossible to polymerize.

Copolymers of the various monomeric N-isopropenyl-cyclic carbamates, such as IO, IO-M, IO-E, IO-P and IOZ, with other N-isopropenyl-cyclic carbamate monomers and other monomeric substances copolymerizable therewith may be prepared in ways analogous to those described in the foregoing, including suspension and emulsion polymerization techniques. To such ends, such monomethylenically unsaturated monomers, as styrene, vinyl toluene, acrylonitrile, vinyl chloride, vinylidene chloride, methyl acrylate, ethyl acrylate, methyl methacrylate and other monomeric acrylate and methacrylate compounds, vinyl acetate, vinyl propionate and the like ethenoids (generally characterizable in containing a $CH_2=C<$ grouping) may be used. Besides those mentioned in the foregoing, other monomers that may be employed suitably for the preparation of copolymerized N-isopropenyl-cyclic carbamate products include those that have been disclosed in United States Letters Patent No. 2,818,362.

When copolymers are prepared, it is frequently desirable for the monomeric N-isopropenyl-cyclic carbamate that is employed (or a mixture of such monomers) to constitute at least about 10 percent by weight of the mixture of copolymerizable materials, e.g., from 10 to 90 or 95 or even as high as 99 percent by weight of such a mixture.

The N-isopropenyl-cyclic carbamate polymers, including PIO, PIO-M, PIO-E, PIO-P and PIOZ, may advantageously be prepared as high polymers having a number average molecular weight, for example, in the range from five hundred to twenty thousand and higher (as determinable from Fikentscher K-values of about 0.5 to as high as 20 or so) and a structural arrangement containing recurring polymerized units that may be depicted in the following manner:

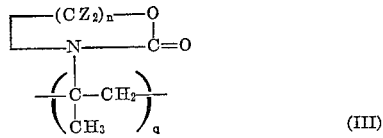

(III)

wherein $q$ is a plural integer, consistent with the foregoing definitions, preferably one whose numerical value is greater than 4 and which may be as large as 160–200 or more. It should be taken into account in connection with the above mentioned "number average" molecular weight ranges that the indicated numerical values depend upon the pecularities of the method of expression which is employed for such statistic. Much higher values, especially in the higher ranges, are equally accurate when the molecular weight is otherwise expressed. Thus, according to the commonly used concept of "weight average" molecular weight [as defined by Frank and Levy, Journal of Polymer Science, 10, 371–8 (1953)], the molecular weight of the polymers having K-values of 20 or so can easily be in the range from forty to sixty thousand and higher. In any event, the indicated values of $q$ are intended to be more approximate averages rather than discrete limits. Of course, lower and higher molecular weight polymers can also be prepared and the herein specified values are not to be construed as theoretical or actual limits of operability, despite their being representative of the products most readily obtained within the limits of practicality. In this connection, it may frequently be advantageous for the Fikentscher K-values of the polymeric products of the present invention to be between about 1 and 5, with their "number average" molecular weights to be between about one and five thousand and the approximate numerical value of $q$ in Formula III to be from 8 to 40 or so.

Generally, N-isopropenyl-cyclic carbamates can usually be obtained as light to white colored, free-flowing powders that are ordinarily of an amorphous, non-crystalline nature, as indicated by X-ray analysis. When the polymers are burned, they ordinarily leave a sponge-like residue which tends to indicate the evolution of carbon dioxide during thermal decomposition. As might be pected, the densities, softening points, fusing and melting temperatures and gas evolution points of the individual poly-N-isopropenyl-cyclic carbamates are found to vary with particular species of the homopolymers and copolymers thereof.

Because of their excellent affinity for many of a wide variety of dyestuffs (including direct, basic, acid, vat and other classes of dyes), the poly-N-isopropenyl-cyclic carbamates can ordinarily be employed with great benefit as dye-assisting adjuvants or dye-receptors for synthetic textile fibers and other shaped articles of normally difficult-to-dye synthetic polymers in which the poly-N-isopropenyl cyclic carbamates may be incorporated. In this capacity, they may be utilized with exceptional benefit in connection with fiber-forming compositions and filamentary shaped articles produced therefrom of the various acrylonitrile polymers, particularly polyacrylonitrile. Besides such desirable utility, certain of the poly-N-isopropenyl-cyclic carbamates exhibit additional utilities of unusual attractiveness. For example, PIO and certain other of the poly-N-isopropenyl-cyclic carbamates of the Formula III may be employed with advantage in wave or curl setting formulations or compositions for human hair; as dye-stripping agents for textile goods and as other varieties of textile assistants; for beverage clarification purposes and in numerous other applications.

The invention is further illustrated in and by the following examples wherein, unless otherwise indicated, all parts and percentages are to be taken by weight.

*Example A.—Preparation of IO-M by trans-isopropenylation*

About 101 grams (1 mole) of 5-methyl-2-oxazolidinone; 176 grams (2.02 moles) of ethyl isopropenyl ether; and 12 grams (0.036 mole) of phenyl mercuric acetate as a catalyst were charged to a 1.5 liter stainless steel rocking autoclave and first flushed, then blanketed therein, with nitrogen. The charged ingredients were then heated to a temperature of about 150° C. and synthermally maintained thereat for a period of about 12 hours, after which period the reaction was terminated. After termination of the reaction, the reaction mass was permitted to cool to room temperature for an 8-hour period. The reaction mass was then fractionally distilled giving about 45 grams of a light yellow liquid under 0.6 mm. Hg absolute pressure in the range from 65 to 80° C. This cut was found to consist of about 82 percent IO-M. Redistillation of the crude monomer product gave about 40 grams of 92 percent IO-M boiling at 50–51° C. under 0.2 mm. Hg absolute pressure. Thus, a yield, based on converted 5-methyl-2-oxazolidinone of about 26 percent was obtained. The physical properties and characteristics of the monomer product were found to be as described in the foregoing specification.

Similar results are obtained when the foregoing is repeated with 2-oxazolidinone; 4-methyl-2-oxazolidinone; 4,5-dimethyl-2-oxazolidinone; 5-ethyl-2-oxazolidone; 4-ethyl-2-oxazolidinone; 5-butyl-2-oxazolidione; 5-phenyl-2-oxazolidinone; 2-oxazinidinone; 5-methyl-2-oxazinidinone; 6-methyl-2-oxazinidinone; 6-ethyl-2-oxazinidinone; 6-chloromethyl-2-oxazinidinone; 6-phenyl-2-oxazinidinone and the like to prepare corresponding N-isopropenyl-cyclic carbamate monomers and when other related starting materials are subjected to transisopropenylation to make other monomers within the scope of Formula II.

*Example B.—Preparation of IO-M by direct isopropenylation*

About 303 grams (3 moles) of 5-methyl-2-oxazolidinone, 37 grams (0.3 mole) of the sodium salt of 5-methyl-2-oxazolidinone and 518 grams (12.95 moles) of methyl acetylene were charged to a 1.5 liter stainless steel autoclave and heated to 150° C. at which temperature they were held for about 24 hours. The reaction product, after termination of the reaction, was devolatilized by heating it to about 95° C. under 5 mm. Hg absolute pressure. It was found to contain about 14 percent of IO-M having the same physical properties as that prepared in the first example.

Similar results are obtained when the foregoing is repeated with 2-oxazolidinone; 4-methyl-2-oxazolidinone; 4,5-dimethyl-2-oxazolidinone; 5-ethyl-2-oxazolidinone; 4-ethyl-2-oxazolidinone; 5-butyl-2-oxazolidinone; 5-phenyl-2-oxazolidinone; 2-oxazinidinone; 5-methyl-2-oxazinidinone; 6-methyl-2-oxazinidinone; 6-ethyl-2-oxazinidinone; 6-chloromethyl-2-oxazinidinone; 6-phenyl-2-oxazinidinone and the like to prepare corresponding N-isopropenyl-cyclic carbamate monomers and when other related starting materials are subjected to direct isopropenylation to make other monomers within the scope of Formula II.

*Example C.—Preparation of PIO-M*

Into a large test tube, equipped with a nitrogen sparger, there was charged about 23.3 grams (0.16 mole) of IO-M along with about 1.0 gram of tert. butyl hydroperoxide as a catalyst. The mixture was then heated at about 80° C. for eight hours under nitrogen sparging. At the end of this period, a dark yellow, viscous, liquid was obtained.

The PIO-M product was isolated from the solution by adding it to a large excess of diethyl ether. This caused a tan solid to precipitate to the bottom of the liquid. The ether was then removed by filtration to leave a relatively slimy precipitate which was then dissolved in minimum quantity of methylene chloride. The resulting solution was added with continued stirring to another large excess of diethyl ether, whereupon the PIO-M was caused to precipitate. The polymer product was filtered and vacuum dried at 50° C. The finally obtained PIO-M was a buff colored, non-crystalline, free-flowing powder. Its Fikentscher K-value was about 15 and its molecular weight (number average) on the order of 16,000.

The PIO-M product was found to have the following additional properties:

| | |
|---|---|
| M.P. (Fisher Johns apparatus) | 165° C. (Commence fusing); 187° C. (fusing); 300° C. (fused, clear yellow, no decomposition). |
| Density at 25° C. | 1.303 grams per cubic centimeter. |
| Theoretical density | 1.28 grams per cubic centimeter (as calculated according to the Van Krovelen method for amorphous high polymers, reported in "Brennsteff-Chemie," 33, p. 260 [1952]). |
| Soluble in | Methylene dichloride, dioxane, 2B alcohol (95 percent ethanol-5 percent benzene mixture), acetone. |
| Insoluble in | Water (essentially), diethyl ether, benzene, Skelly Solvent 100–140° C. |

Under a plate pressure of about 30,000 pounds per square inch at 150° C., the PIO-M product was compression molded to a brittle film.

Similar results are obtained when the foregoing is repeated in order to prepare such polymers as PIO, PIO-E, PIO-P, PIOZ, and other of the homopolymers of Formula III, using appropriate starting monomers for their preparation.

*Example D.—Copolymers of IO-M*

Copolymers of IO-M and other of the N-isopropenyl-cyclic carbamate members of the Formula II with such monomers as styrene, acrylonitrile, vinyl acetate, vinyl chloride, vinylidene chloride, N-vinyl-2-pyrrolidinone and the like are readily prepared by following conventional copolymerization techniques for preparation of the desired copolymeric product. Many of such copolymers have advantageous uses similar and analogous to those of the homopolymeric N-isopropenyl-cyclic carbamates.

*Example E.—Use of PIO-M*

A polyacrylonitrile fiber is obtained in a water-hydrated or aquagel condition in which it contains about 2 parts of water to each part of polymer therein. The aquagel, which is oriented by wet stretching after extrusion, is obtained in a known manner by salt-spinning a solution containing about 10 percent of fiber-forming polyacrylonitrile in a 60 percent aqueous zinc chloride solvent therefor into an aqueous coagulating bath containing about 42 percent of zinc chloride. The aquagel fiber is immersed at room temperature in a 3 percent ethanol solution of PIO-M having a Fikentscher K-value of about 15 until about 10 percent (on the dry weight of the resulting fiber product) of the PIO-M is incorporated therein. After the impregnation, the fiber product is washed thoroughly with water, then dried at about 150° C. for 30 minutes to convert it to a hydrophobic form. It is found to be readily dyeable to deep and level shades of coloration upon a 4 percent dyeing in the conventional manner with Calcodur Pink 2BL, a direct dyestuff having the Colour Index 353. The PIO-M-containing fiber product is also readily and excellently dyeable with such dyestuffs as Sevron Brilliant Red 4G (formerly known as Basic Red 4G—Colour Index Basic Red 14), a basic dyestuff; Amacel Scarlet BS, an acetate dyestuff (American Prototype No. 244); Calcocid Alizarine Violet, an acid dye (Colour Index 1080) and the like.

Excellent results similar to those demonstrated in the foregoing can also be obtained with other of the N-isopropenyl-cyclic carbamate polymers of the Formula III and copolymers containing such recurring units, and when the polymeric products are utilized for such purposes as dye-stripping agents, for clarifying such beverages as beer and wine, in hair setting formulations, and in numerous other applications.

What is claimed is:

1. A monomeric compound of the structure:

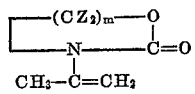 (II)

wherein each Z is independently selected from the group consisting of hydrogen, alkyl radicals containing from 1 to 4 carbon atoms, monohaloalkyl radicals containing from 1 to 4 carbon atoms, and aryl radicals containing from 6 to 10 carbon atoms and $m$ is an integer from 2 to 3.

2. Monomeric N-isopropenyl-2-oxazolidinone.
3. Monomeric N-isopropenyl-5-methyl-2-oxazolidinone.
4. Monomeric N-isopropenyl-5-ethyl-2-oxazolidinone.
5. Monomeric N-isopropenyl-5-phenyl-2-oxazolidinone.
6. Monomeric N-isopropenyl-2-oxazinidinone.
7. Method for the preparation of a monomeric N-isopropenyl-cyclic carbamate compound of the structure:

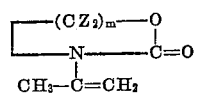

wherein each Z is independently selected from the group consisting of hydrogen, alkyl radicals containing from 1 to 4 carbon atoms, monohaloalkyl radicals containing from 1 to 4 carbon atoms, and aryl radicals containing from 6 to 10 carbon atoms and $m$ is an integer from 2 to 3, which method comprises mixing a starting cyclic carbamate material of the structure:

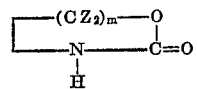

wherein Z and $m$ are as above described, with an alkyl isopropenyl ether that contains from 1 to 10 carbon atoms in the alkyl radical and with between about 1 and about 10 weight percent, based on the weight of the starting cyclic carbamate material; of a catalyst selected from the group consisting of mercuric acetate, phenyl mercuric acetate, zinc acetate, mercuric benzoate, and their mixtures, then heating said mixture to a temperature between about 110° C. and 170° C. until at least a portion of said starting material is converted to said monomeric compound.

8. Method for the preparation of a monomeric N-isopropenyl-cyclic carbamate compound of the structure:

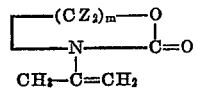

wherein each Z is independently selected from the group consisting of hydrogen, alkyl radicals containing from 1 to 4 carbon atoms, monohaloalkyl radicals containing from 1 to 4 carbon atoms, and aryl radicals containing from 6 to 10 carbon atoms and $m$ is an integer from 2 to 3, which method comprises reacting, in the presence of between about 1 and 5 percent by weight, based on the weight of the starting material, of an alkali selected from the group consisting of alkali metals, alkali metal hydroxides and alkaline earth metal hydroxides, a corresponding cyclic carbamate material of the general formula:

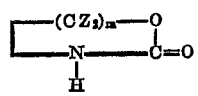

wherein Z and $m$ are as above described with methyl acetylene under a pressure of about 400 to 1200 p.s.i. at a temperature between about 100 and 250° C until at least a portion of said starting cyclic carbamate material is converted to said monomer.

9. An addition polymer having as an essential constituent of its polymeric structure material interpolymerized characterizing proportions of the recurring group:

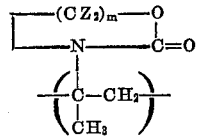 (III)

wherein each Z is independently selected from the group consisting of hydrogen, alkyl radicals containing from 1 to 4 carbon atoms, monohaloalkyl radicals containing from 1 to 4 carbon atoms, and aryl radicals containing from 6 to 10 carbon atoms and $m$ is an integer from 2 to 3.

10. An addition copolymer of (a) a monomer as in claim 1 and (b) a compound which is different from the compound of (a), is copolymerizable therewith and which contains a $CH_2=C<$ grouping.

11. The copolymer of claim 10, wherein the compound of (b) is a vinyl compound.

12. An addition polymer of N-isopropenyl-2-oxazolidinone.

13. An addition polymer of N-isopropenyl-5-methyl-2-oxazolidinone.

14. An addition polymer of 5-ethyl-N-isopropenyl-2-oxazolidinone.

15. An addition polymer of N-isopropenyl-5-phenyl-2-oxazolidinone.

16. An addition polymer of N-isopropenyl-2-oxazinidinone.

17. A homopolymer characterized by having as chemically combined recurrent groups in its molecule:

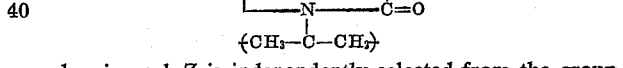

wherein each Z is independently selected from the group consisting of hydrogen, alkyl radicals containing from 1 to 4 carbon atoms monhaloalkyl radicals containing from 1 to 4 carbon atoms, and aryl radicals containing from 6 to 10 carbon atoms and $m$ is an integer from 2 to 3.

References Cited in the file of this patent

UNITED STATES PATENTS

| | | |
|---|---|---|
| 2,755,286 | Bell | July 17, 1956 |
| 2,786,043 | Schuller | Mar. 19, 1957 |
| 2,818,362 | Drechsel | Dec. 31, 1957 |
| 2,818,399 | Drechsel | Dec. 31, 1957 |
| 2,831,858 | De Benneville | Apr. 22, 1958 |

FOREIGN PATENTS

| | | |
|---|---|---|
| 858,402 | Germany | Dec. 8, 1952 |
| 722,523 | Great Britain | Jan. 26, 1955 |

OTHER REFERENCES

Ham: Textile Research Journal, July 1954, pages 597, 604–614.